United States Patent Office 3,420,812
Patented Jan. 7, 1969

3,420,812
DISAZO DYESTUFFS METAL-COMPLEX
Gerhard Langbein, Hofheim, Taunus, and Fritz Meininger, Frankfurt am Main, Germany, assignors to Farbwerke Hoechst Aktiengesellschaft, vormals Meister Lucius & Bruning, Frankfurt am Main, Germany, a corporation of Germany
No Drawing. Filed May 11, 1965, Ser. No. 454,998
Claims priority, application Germany, May 13, 1964, F 42,863
U.S. Cl. 260—148        7 Claims
Int. Cl. C09b 45/24; C09b 45/26; C09b 45/28

---

ABSTRACT OF THE DISCLOSURE

Water-soluble, disazo dyestuffs of the formula

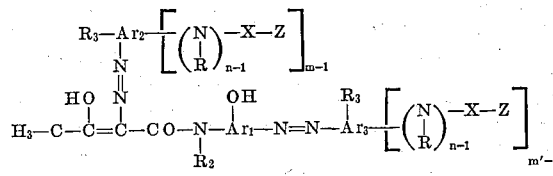

and the complex metal compounds of said disazo dyestuffs, wherein $Ar_1$ is benzene or naphthalene, $Ar_2$ and $Ar_3$ are benzene, naphthalene, benzene sulfonic acid, naphthalene sulfonic acid, lower alkoxy-benzene, nitrobenzene, nitrobenzene sulfonic acid, lower alkoxy-nitrobenzene sulfonic acid or chlorobenzene sulfonic acid radicals, R is hydrogen or lower alkyl, $R_2$ is hydrogen or lower alkyl, $R_3$ is hydrogen, hydroxyl, carboxyl or lower alkoxy, X is sulfonyl or carbonyl, Z is β-chloroethyl, β-sulfatoethyl, β-phosphatoethyl or vinyl, n is 1 or 2, the sum of m and m' being at least 3, and p stands for 1 or 2, and wherein the groups $R_3$ in $Ar_2$ and $Ar_3$ and —OH in $Ar_1$ are each linked in ortho-position to the adjacent azo group.

---

The present invention relates to new water-soluble disazo dyestuffs and to their metal complex compounds as well as to a process for preparing them; in particular, the invention relates to water-soluble disazo dyestuffs of the general formula

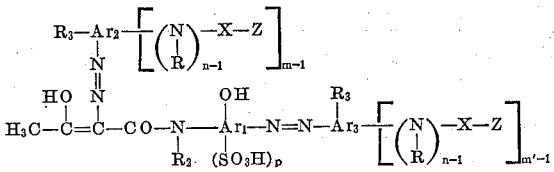

and to the metal complex compounds thereof, i.e., copper, nickel, cobalt, chromium, manganese and iron complex compounds, wherein $Ar_1$ represents a benzene or naphthalene radical containing at least one sulfonic acid group, $Ar_2$ and $Ar_3$ represent the same or different benzene, naphthalene, benzene sulfonic acid, naphthalene sulfonic acid, lower alkoxy-benzene, nitrobenzene, benzene carboxylic acid, nitrobenzene sulfonic acid, lower alkoxy-nitrobenzene sulfonic acid and chlorobenzene sulfonic acid radicals, R represents a hydrogen atom, an aliphatic or araliphatic radical, $R_2$ represents a hydrogen atom or an alkyl group, $R_3$ represents a hydrogen atom, a hydroxyl, carboxyl or alkoxy group, X represents a sulfonyl or carbonyl group, Z represents a β-chloroethyl, β-sulfatoethyl, β-phosphatoethyl or vinyl group, n stands for 1 or 2 and m and m' each stand for 1, 2 or 3, the sum of m+m' being at least 3, and wherein the groups $R_3$ in $Ar_2$ and $Ar_3$ and —OH in $Ar_1$ are each linked in ortho-position to the adjacent azo group.

Now we have found that valuable water-soluble disazo dyestuffs and the metal complex compounds thereof can be obtained by coupling simultaneously or successively 2 mols of the same or different aromatic diazo compounds of which at least one contains at least one group of the formula

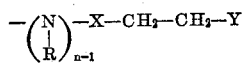   (1)

or

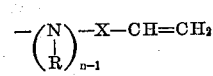   (2)

wherein R represents a hydrogen atom, an aliphatic or araliphatic radical, X represents a sulfonyl or carbonyl group, Y represents a halogen atom, the radical of a polybasic acid or a hydroxyl group, and n stands for 1 or 2, with coupling components of the general formula

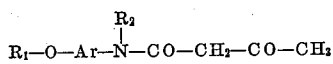

wherein Ar represents a benzene or naphthalene radical containing at least one sulfonic acid group, $R_1$ represents a hydrogen atom or an acyl radical and $R_2$ represents a hydrogen atom or an alkyl group, when using coupling components, in which $R_1$ designates an acyl radical, the second mol of the diazo compound is not coupled until the acyl radical has been split off by saponification, whereupon in the disazo dyestuffs obtained, which contain a hydroxyl group in the groups of Formula 1, said alcoholic hydroxyl group is esterified by treatment with polybasic acids, their monoamides or monochlorides, and, if desired, by treating the dyestuffs obtained with agents yielding metal, provided they contain groups forming metal complexes or capable of being converted into such groups.

The disazo dyestuffs obtained which contain groups of Formula 1 can be converted, by treatment with an aqueous alkali, into disazo dyestuffs containing groups of Formula 2. If, however, Y represents a hydroxyl group in Formula 1, the treatment is not carried out until said hydroxyl groups has been esterified.

For the preparation of the novel disazo dyestuffs there may be used, for example, the following diazo components: 1-aminobenzene-4-β-hydroxyethylsulfonyl-sulfuric acid ester, 1-aminobenzene-4-vinylsulfone, 1-aminobenzene-3-β-chloroethylsulfone, 1-amino-2-hydroxybenzene-5-β-hydroxyethylsulfonyl-sulfuric acid ester, 1-amino-2-hydroxybenzene - 5 - β-hydroxyethylsulfone, 1-amino-2-hydroxy - 5 - N-methylethionylaminobenzene, 1-amino-4-acroylaminobenzene - 2 - sulfonic acid and 1 - amino-3-β-chloropropionylaminobenzene. Disazo dyestuffs containing only one reactive group of the above Formulae 1 and 2 can be prepared also with the use of any other aromatic amines, such, for example, as derivatives of aminobenzene, anthranilic acid, orthoaminophenol, naphthylamine or ortho-aminonaphthol.

As coupling components there may be used, for example, the following compounds:
1-hydroxy-7-acetoacetylaminonaphthalene-3-sulfonic acid,
1-hydroxy-5-acetoacetylaminonaphthalene-3-sulfonic acid,
1 - hydroxy - 8 - acetoacetylaminonaphthalene - 3,6 - disulfonic acid,
1-hydroxy-3-acetoacetylaminobenzene-4-sulfonic acid,
1 - hydroxy - 7 - acetoacetyl - N - methylaminonaphthalene-3-sulfonic acid or 1-(p-toluene-sulfonyloxy)-7-acetoacetylaminonaphthalene-3-sulfonic acid.

When operating in a weakly acid medium it is possible to couple diazo components having a low coupling energy, such, for example, as ortho-aminophenol derivatives or ortho-aminonaphthol derivatives or 2-aminobenzoic acid, only once with the coupling components of the above formula, in which $R_1$ represents a hydrogen atom. In this case, monoazo dyestuffs can be isolated which contain the diazo component linked to the acetoacetylamino group (enolic side). When using diazo components having a higher coupling energy, such as aniline-sulfonic acids or nitroanilines, monoazo dyestuffs can only be prepared if the naphtholic hydroxyl group is previously protected by acylation, for instance with p-toluene-sulfochloride, and resaponified after the coupling. By further coupling with another diazotized amine, advantageously in a neutral or weakly alkaline medium, it is possible to prepare disazo dyestuffs having different diazo components.

As far as the dyestuffs contain groups capable of being metallized, for instance two hydroxy groups or hydroxycarboxy groups in o,o'-position to an azo bridge or groups capable of being converted into such groups, said groups can be converted in known manner into metal complex compounds. As agents yielding metal there may be used copper, nickel, cobalt, chromium, manganese or iron compounds. By metallizing the monoazo dyestuffs, coupling them to form disazo dyestuffs and treating them with another agent yielding metal it is also possible to prepare diazo dyestuffs containing different complex-bound metals. A second hydroxy group which is in o'-position to an o-hydroxy-azo group can be introduced also by oxydative coppering.

The new dyestuffs are suitable for dyeing and printing various fibrous materials, such as for example natural or regenerated cellulosic materials, wool, silk or polyamide fibers. They can be fixed on the fibrous material at normal temperature or at an elevated temperature in the presence of agents having an alkaline reaction or yielding alkali in the heat. The dyestuffs obtained according to the process of the present invention are distinguished by a high tinctorial strength, good to excellent light and wet fastness properties and, in many cases, by a good affinity for the fiber when the dyeing is carried out by the exhaust process.

As compared with known dyestuffs of similar constitution, for example with those described in German Patent Nos. 870,883, 956,794 and 1,077,812, the new dyestuffs are distinguished by considerably better properties of wet fastness.

The following examples serve to illustrate the invention but they are not intended to limit it thereto, the parts being by weight unless otherwise mentioned and the relationship of parts by weight to parts by volume being the same as that of the kilogram to the liter.

Example 1

217 parts of 1-amino-2-hydroxybenzene-5-β-hydroxyethyl-sulfone are introduced at room temperature while stirring into 570 parts of concentrated sulfuric acid and stirred for several hours until completely dissolved. The mixture is then poured onto 1,500 parts of ice and diazotized at 5°–10° C. with a solution of 70 parts of sodium nitrite in 110 parts of water. After addition of 1,000 parts of water and 1,500 parts of ice the whole is neutralized by gradually adding the total amount of 1,000 parts of sodium bicarbonate. The temperature is allowed to rise slowly. At 20° C. the formation of foam ceases. 170 parts of the sodium salt of 1-hydroxy-7-acetoacetylamino-naphthalene-3-sulfonic acid are now introduced into the diazotization mixture, the mixture is adjusted to pH 7.5–8.0 by addition of some sodium bicarbonate, heated to 30°–35° C. and stirred for several hours until the coupling is complete. The mixture is then adjusted to a weakly acid pH-value by addition of a 20% hydrochloric acid, the dyestuff salted out by means of potassium chloride and isolated by suction filtration.

The dyestuff which is obtained in the form of a dark brown powder dissolves in water with a red brown color. Its solution changes to red violet upon addition of alkali.

In the form of its free acid the dyestuff corresponds to the following formula

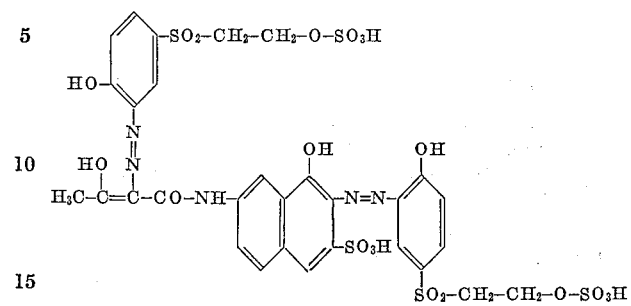

180 parts of the dyestuff which is obtained in a concentration of about 50% are introduced into a solution of 50 parts of crystallized copper sulfate and 110 parts of crystallized sodium acetate in 2,000 parts of water and the whole is heated for 1–2 hours to 80° C. After filtration of the solution the dyestuff is separated by addition of sodium chloride and isolated. It is violet brown powder which dissolves in water with a red brown color and dyes cellulose fibers in the presence of agents having an alkaline reaction red brown shades which are fast to washing and to light. The dyestuff contains 2 copper atoms per molecule.

When using for the metallization, instead of the amount of copper sulfate given above, 30 parts of crystallized cobalt sulfate, a dyestuff is obtained in the form of a blackish brown powder which dissolves in water with a brown color. Prints and padded dyeings prepared with this dyestuff on cotton fabrics show a strong neutral brown having excellent fastness properties to wetting and to light. Valuable brown dyeings and prints are also obtained on polyamide fibers.

Example 2

189 parts of 1-amino-2-hydroxybenzene-5-sulfonic acid are introduced into 3,800 parts of water and 300 parts of concentrated sulfuric acid, and the whole is then diazotized at 5°–10° C. with a solution of 70 parts of sodium nitrite in 110 parts of water. The excessive sodium nitrite is decomposed by addition of some amidosulfonic acid. 345 parts of the sodium salt of 1-hydroxy-5-acetoacetylamino-naphthalene-3-sulfonic acid are introduced into the mixture obtained in this manner, the pH-value of the mixture is adjusted to about 4.5 by addition of sodium bicarbonate, then 50 parts of crystallized sodium acetate are added and the whole is stirred at room temperature until the coupling is complete. The yellow monoazo dyestuff separated which corresponds to the formula

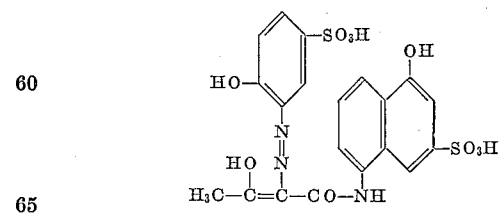

is filtered with suction and subsequently introduced with stirring into 2,000 parts of water. Then 310 parts of the inner sulfate of 1-diazo-2-hydroxybenzene-5-β-hydroxyethylsulfonyl-sulfuric acid ester are added, the pH-value is adjusted to 7.5–8.0 by addition of sodium bicarbonate, the whole is heated to 35°–40° C. and stirred for several hours until the coupling is complete. The dyestuff is precipitated by addition of sodium chloride and then filtered with suction. It constitutes a dark brown powder which dissolves in water with a red brown color. The dyestuff corresponds to the following formula

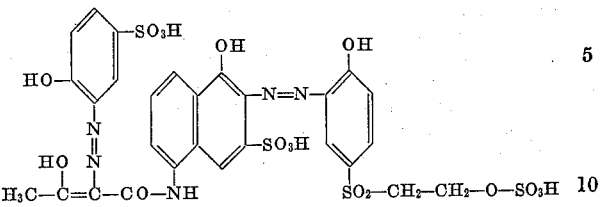

The copper complex dyestuff prepared from the dyestuff obtained in the manner described in Example 1 contains 2 copper atoms per molecule. It constitutes a red brown powder and dissolves in water with a red brown color. With this dyestuff strong red brown dyeings having a good wet fastness and a very good fastness to light are obtained on cellulose fibers in a long bath in the presence of alkalies.

The cobalt complex dyestuff prepared in analogous manner contains only one cobalt atom per molecule and produces prints and padded dyeings having a neutral brown color which is fast to washing and to light.

Example 3

345 parts of the sodium salt of 1-hydroxy-7-acetoacetyl-aminonaphthalene-3-sulfonic acid are dissolved in 2,500 parts of water. 308 parts of the inner sulfate of 1-diazo-2-hydroxybenzene-5-$\beta$-hydroxyethylsulfonyl-sulfuric acid ester are then introduced into this solution while stirring, a 20% sodium acetate solution is dropped in until the mixture shows a pH-value of 3.0, 500 parts of potassium chloride are added and the whole is stirred at about 30° C. until the coupling is complete. The monoazo dyestuff of the formula

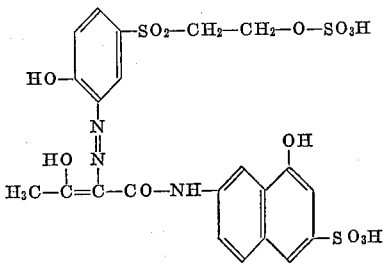

separates gradually from the solution in the form of a yellow precipitate and is isolated by suction.

25 parts of 1-amino-2-methoxy-4-nitrobenzene-5-sulfonic acid are diazotized at 5°–10° C. in a solution of 250 parts of water and 25 parts of concentrated hydrochloric acid by dropwise addition of 17.5 parts of a 40% sodium nitrite solution. The mixture is introduced into a solution of 63 parts of the above monoazo dyestuff in 250 parts of water and 75 parts of anhydrous sodium acetate, and the whole is stirred at room temperature until the coupling is complete. The disazo dyestuff formed which corresponds to the formula

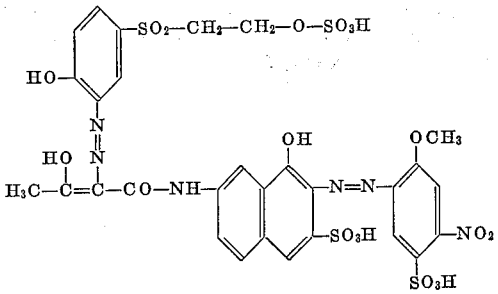

is precipitated by addition of potassium chloride. It constitutes a dark brown powder which dissolves with a red color in water.

170 parts of the dyestuff which is obtained in a concentration of about 50% are introduced into a solution of 25 parts of crystallized copper sulfate and 55 parts of crystallized sodium acetate in 1,000 parts of water and the whole is heated for 2 hours to 80° C. The dyestuff is then precipitated by means of potassium chloride and filtered with suction. It contains 1 copper atom per molecule and constitutes a dark brown powder which dissolves in water with a red brown color. When applied to cotton or polyamide fabrics in the presence of agents having an alkaline reaction the dyestuff obtained produces brown prints having a good fastness to wetting and to light.

Example 4

159 parts of 1-hydroxy-8-aminonaphthalene-3,6-disulfonic acid are neutralized in 1,300 parts of water, while stirring, by addition of anhydrous sodium carbonate, and completely dissolved. 45 parts of diketene are then dropped in slowly at room temperature and the whole is stirred for some time until no free amino group can be detected any longer.

183 parts of 1-aminobenzene-4-vinylsulfone are diazotized in a solution of 1,000 parts water and 500 parts by volume of 5 N-hydrochloric acid at 5–10° C. by dropwise addition of 175 parts of a 40% sodium nitrite solution. The diazotization mixture is added to the solution of 1-hydroxy-8-acetoacetylaminonaphthalene-3,6-disulfonic acid prepared in the manner described above. Sodium bicarbonate is slowly introduced, with stirring until a pH-value of 6.5–7.0 is obtained, and the whole is stirred until the coupling is complete. The disazo dyestuff formed is salted out with potassium chloride and filtered with suction. It constitutes a dark red powder, dissolves in water with a red color and corresponds to the following formula

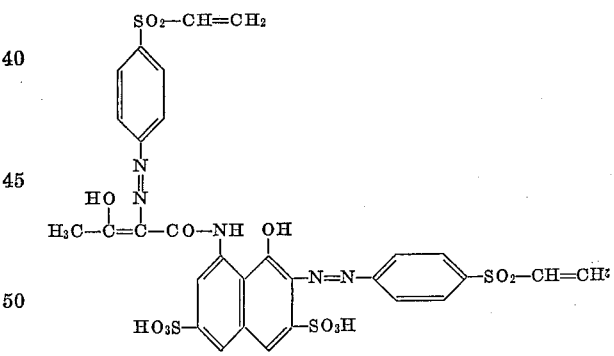

When applied to cellulose or polyamide fibers or wool in the presence of agents having an alkaline reaction the dyestuff yields dark red dyeings or prints having excellent wet fastness properties and a medium fastness to light.

Example 5

217 parts of a 1-amino-2-hydroxybenzene-5-$\beta$-hydroxyethylsulfone are converted into the sulfuric acid ester in the manner described in Example 1 and diazotized. A solution of 1-hydroxy-8-acetoacetylaminonaphthalene-3,6-disulfonic acid prepared as described in Example 4 is added to the neutralized diazotization mixture. The pH-value of the mixture is adjusted to 7.5–8.0 by addition of sodium bicarbonate and maintained at this value. The mixture is heated to 30–35° C. and stirred until the coupling is complete. The dyestuff is precipitated by acidification with hydrochloric acid and addition of potassium chloride and isolated. It constitutes a dark powder and dissolves in water with a yellow red color. The color of the solution changes to red violet upon addition of alkali. The dyestuff corresponds to the following formula

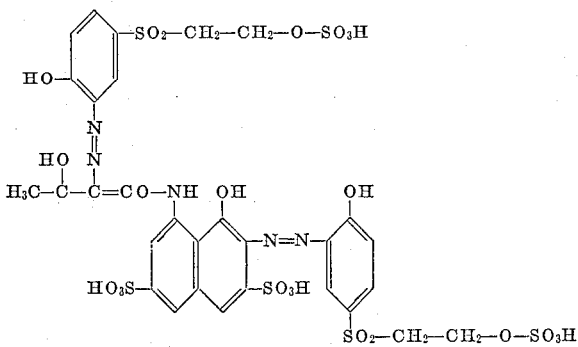

170 parts of the dyestuff which is obtained in a concentration of about 60% and heated to the boil within 3 hours in 750 parts of water containing 26 parts of chromium triacetate. The reaction mixture is then evaporated to dryness in vacuo. The dyestuff which is obtained in the form of a black powder dissolves in water with a greyish-green color. The prints obtained on cotton or staple fiber fabrics have a strong olive green color of excellent fastness properties to wetting and light.

Example 6

170 parts of the sodium salt of 1-hydroxy-7-acetoacetyl-amino-naphthalene-3-sulfonic acid are dissolved in 2,000 parts of water and 230 parts of the diazoxide of 1-amino-2-hydroxy-benzene-5-β-hydroxyethylsulfone are added with stirring. The pH-value of the mixture is adjusted to 12.0 by dropwise addition of sodium hydroxide solution of 380 Bé. and the whole is stirred for several hours at room temperature until the coupling is complete. By dropwise addition of a 20% hydrochloric acid the mixture is then adjusted so as to show a weakly acid reaction to Congo paper and stirred until thinly liquid. The product is then filtered with suction, washed with a small amount of dilute hydrochloric acid and dried. In its present form the dyestuff is only sparingly soluble in water, but dissolves with a red brown color upon addition of alkali. It corresponds to the following formula

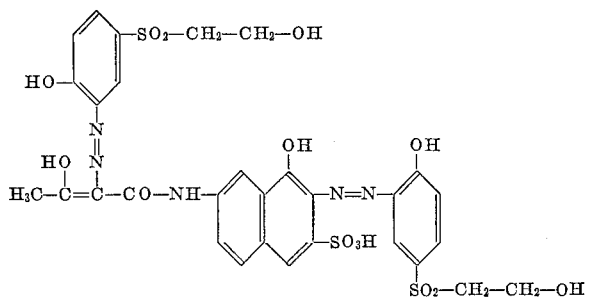

200 parts of said dyestuff are introduced slowly and with stirring into 1,000 parts of concentrated sulfuric acid. The whole is stirred for several hours at 25–30° C. until the dyestuff has completely dissolved. The mixture is then poured on 3,000 parts of ice while stirring is continued and the dyestuff is salted out by addition of 800 parts of sodium chloride. After filtration by suction the filter cake which still shows a strongly acid reaction is once more suspended with saturated sodium chloride solution, neutralized by careful addition of sodium bicarbonate and again filtered with suction.

The dyestuff which is obtained in the form of a dark brown powder is identical with that described in Example 1 and may likewise be converted into metal complex compounds.

Example 7

345 parts of the sodium salt of 1-hydroxy-7-acetoacetyl-amino-naphthalene-3-sulfonic acid are dissolved in 4,000 parts of water, and 30 parts of glacial acetic acid are added. Subsequently 228 parts of the diazoxide of 1-amino-2-hydroxy-benzene-5-β-hydroxyethylsulfone are introduced with stirring, and the whole is stirred for several hours at room temperature until the coupling is complete. The monoazo dyestuff which is obtained in the form of a yellow precipitate is filtered with suction, washed with a 5% sodium chloride solution and dried. It corresponds to the following formula

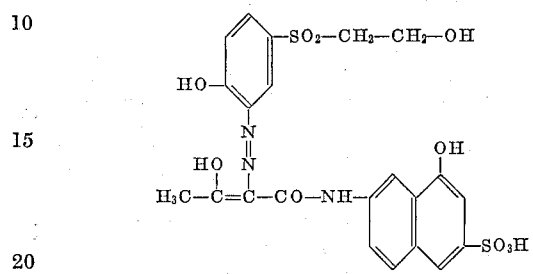

80 parts of the dyestuff which is obtained in a concentration of about 70% are introduced into 300 parts of anhydrous pyridine and, after addition of 5 parts of urea, heated to 85° C. At this temperature 35 parts of amidosulfonic acid are gradually introduced and the whole is then heated for about 1 hour to 100–105° C. After cooling the mixture is poured into 2,500 parts of water, a 20% hydrochloric acid is added until the mixture shows a weakly acid reaction to Congo paper, the precipitation of the dyestuff is completed by introduction of 200 parts of sodium chloride and the dyestuff is filtered with suction.

The sulfuric acid ester of the monoazo dyestuff which is obtained in the form of a yellow powder is identical with the monoazo dyestuff described in Example 3. By further coupling with any diazotized aromatic amines desired disazo dyestuffs can be prepared in the manner described in Example 3.

The esterification in pyridine may be effected in analogous manner with the aid of chlorosulfonic acid at a temperature between 30° and 40° C.

Example 8

100 parts of the monoazo dyestuff described in Example 3 which is obtained in a concentration of about 60%, are introduced into a solution of 25 parts of crystallized copper sulfate and 55 parts of crystallized sodium acetate in 800 parts of water and stirred for 1 hour at 80° C. After cooling the copper complex dyestuff formed is salted out by means of potassium chloride, filtered with suction and washed with saturated potassium chloride solution. The moist dyestuff paste is then introduced into 500 parts of water, and 31 parts of the inner sulfate of 1 - amino-2-hydroxybenzene-5-β-hydroxyethylsulfonyl-sulfuric acid ester are added. The pH-value of the mixture is adjusted to 7.5–8.0 by addition of some sodium bicarbonate and the whole is stirred at 35° C. until the coupling is complete. The dyestuff which has been precipitated with potassium chloride and isolated is obtained in the form of a dark brown powder. It dissolves in water with a red brown color and corresponds to the following formula

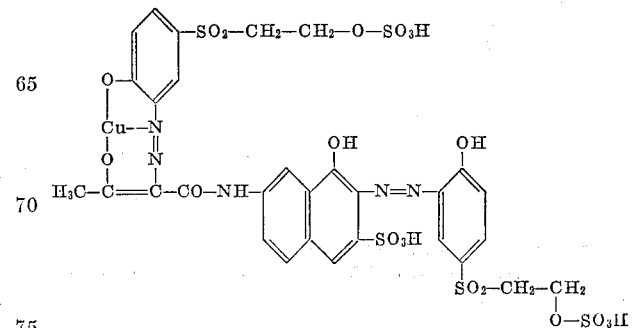

100 parts of said dyestuff which is obtained in a strength of about 50% are stirred up for 1 hour at 80° C. in 500 parts of water containing 10 parts of cobalt acetate. After cooling the dyestuff is precipitated with potassium chloride and filtered with suction. The dyestuff which is obtained in the form of a dark brown powder dissolves in water with a red brown color and, when applied to cotton or staple fiber fabrics, produces strong brown prints or dyeings showing excellent fastness properties to light and wet processing. 2 dyestuff molecules contain together 2 copper atoms and 1 cobalt atom.

Example 9

320 parts of 1-hydroxy-7-acetoacetylamino-naphthalene-3-sulfonic acid are dissolved in 3,000 parts of water. While stirring 644 parts of the inner sulfate of 1-diazo-2-methoxybenzene - 5 - β-hydroxyethylsulfonyl-sulfuric acid ester are introduced, the pH-value of the mixture is adjusted to 6.5–7.0 by means of sodium bicarbonate, and the whole is stirred until the coupling is complete. The dyestuff is precipitated by means of potassium chloride. It is obtained in the form of a red powder which dissolves in water with a red color. In the presence of agents having an alkaline reaction scarlet dyeings of good wet fastness properties are obtained on cellulose fibers and on wool. The dyestuff corresponds to the following formula

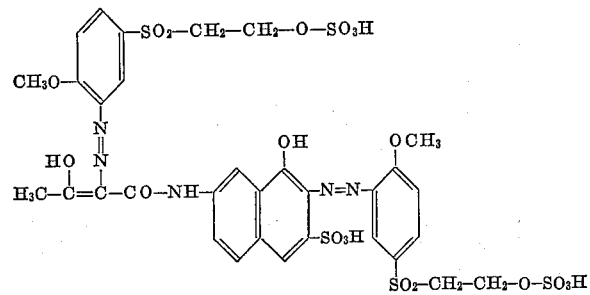

160 parts of the dyestuff which is obtained in a strength of about 60% are heated to the boil for about 20 hours, in 1,000 parts of water containing 60 parts of crystallized copper sulfate, 70 parts of crystallized sodium acetate and 30 parts of glacial acetic acid. After cooling the dyestuff is salted out by means of potassium chloride and filtered with suction. The dyestuff obtained contains 2 copper atoms per molecule and has the same properties and composition as the copper complex dyestuff described in Example 1.

Example 10

189 parts of 1 - amino - 2 - hydroxybenzene - 5 - sulfonic acid are introduced into a solution of 3,800 parts of water and 300 parts of concentrated hydrochloric acid and diazotized at 5–10° C. with 175 parts of a 40% sodium nitrite solution. 345 parts of the sodium salt of 1 - hydroxy - 7 - acetoacetylamino-naphthalene - 3 - sulfonic acid are introduced into this mixture, the pH-value is adjusted to 4.5 by addition of sodium bicarbonate, 50 parts of crystallized sodium acetate are added and the whole is stirred at room temperature until the coupling is complete. The yellow monoazo dyestuff precipitates during the operation. 295 parts of the inner salt of 1-diazobenzene - 4 - β - hydroxyethylsulfonyl - sulfonic acid ester are then added, the pH-value is adjusted to 6.0–6.5 by addition of sodium bicarbonate and the whole is stirred at room temperature until the coupling is complete. The mixture is then adjusted with hydrochloric acid to a pH-value in a weakly acid range, the disazo dyestuff is precipitated by addition of potassium chloride and filtered with suction. The dyestuff which is obtained in the form of a red brown powder dissolves in water with a red brown color and dyes cotton orange brown shades. It corresponds to the following formula

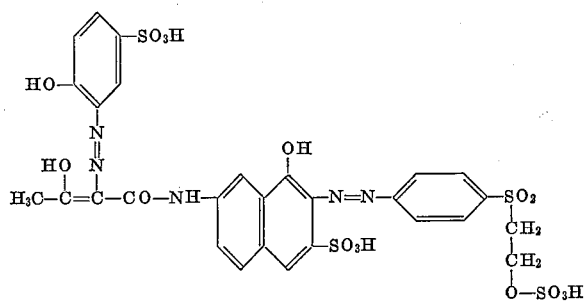

135 parts of said dyestuff which is obtained in a strength of about 60% are introduced into a solution of 56 parts of crystallized copper sulfate and 60 parts of crystallized sodium acetate in 1,000 parts of water. The pH-value of the mixture is adjusted to 5.5–6.0 by addition of a small amount of anhydrous sodium carbonate. 50 parts of a 15% hydrogen peroxide are dropped into this solution within 2 hours at 15–20° C., and the whole is stirred for some time at room temperature. The dyestuff which has been precipitated by means of potassium chloride and isolated constitutes a brown powder which dissolves in water with a red brown color. The dyestuff corresponds to the following formula

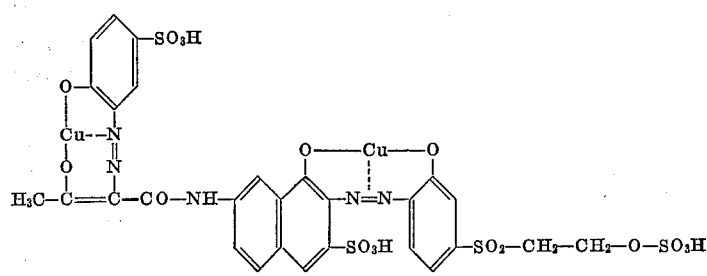

In the presence of agents having an alkaline reaction red brown dyeings and prints of good fastness properties to light and wetting are obtained on cotton and staple fibers.

Example 11

520 parts of the sodium salt of 1 - (p - toluene-sulfonyloxy) - 7 - acetoacetylamino - naphthalene - 3 - sulfonic acid are suspended in 2,500 parts of water. 230 parts of the inner sulfate of 1 - diazo - 2 - nitrobenzene-4-sulfonic acid are introduced while stirring, 100 parts of anhydrous sodium acetate are added and the whole is stirred until the coupling is complete. By addition of a small amount of sodium chloride the monoazo dyestuff precipitates from the solution which has an intense yellow color in the form of lemon yellow flakes. The dyestuff is separated from excessive diazonium salt by suction, the moist filter cake is dissolved in 5,000 parts of water, 1,000 parts by volume of sodium hydroxide solution of 38° Bé. are added and the whole is heated for a short period of time to 90° C. After cooling the whole is neutralized by means of concentrated hydrochloric acid, 310 parts of the inner sulfate of 1 - diazo - 2 - hydroxybenzene - 5 - β - hydroxyethylsulfonyl - sulfuric acid ester are added while stirring, the pH-value of the mixture is adjusted to 7.5–8.0 by addition of sodium bicarbonate and the whole is stirred at 30–35° C. until the coupling is complete.

The disazo dyestuff formed is precipitated with potassium chloride and filtered with suction. It constitutes a dark brown powder which dissolves in water with a red brown color. The dyestuff corresponds to the following formula

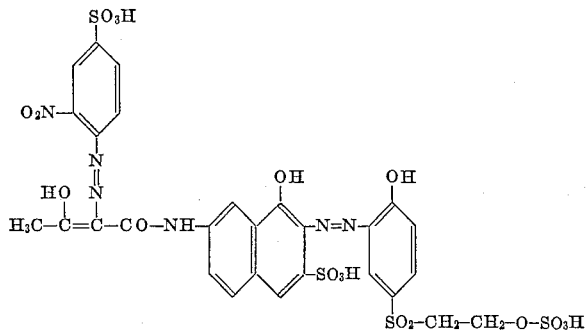

170 parts of the dyestuff which is obtained in a concentration of about 50% are introduced into a solution of 25 parts of crystallized copper sulfate and 55 parts of crystallized sodium acetate in 1,000 parts of water and the whole is heated for 1 hour to 80° C. The dyestuff is precipitated by means of sodium chloride and filtered with suction. It constitutes a dark brown powder which dissolves in water with a red brown color. With the use of this dyestuff claret dyeings and prints having a good fastness to light and to wet processing are obtained on cellulose fibers.

Example 12

312 parts of 1-amino-2-hydroxy-5-(N-ethionyl-N-methylamino)-benzene are diazotized at 5–10° C. in a solution of 2,000 parts of water and 250 parts of concentrated hydrochloric acid by dropwise addition of a solution of 70 parts of sodium nitrite in 110 parts of water. Excessive sodium nitrite is decomposed by addition of a small amount of urea. 170 parts of the sodium salt of 1-hydroxy-7-acetoacetylamino-naphthalene-3-sulfonic acid are then introduced into the mixture, the pH-value is adjusted to 7.5 by addition of sodium bicarbonate and the whole is stirred for several hours at room temperature until the coupling is complete. The dyestuff which has been precipitated by addition of potassium chloride and isolated constitutes a dark brown powder which dissolves in water with a brown color. In the form of its free acid it corresponds to the following formula

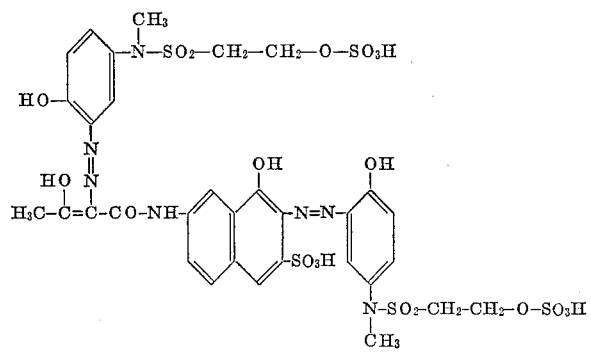

The copper complex dyestuff prepared from the above dyestuff in the manner described in Example 1 contains 2 copper atoms per molecule. The dyestuff constitutes a brown powder which dissolves in water with a red brown color. When applied to cotton or staple fibers in the presence of agents having an alkaline reaction the dyestuff yields red brown dyeings and prints having an excellent fastness to light and washing.

The corresponding cobalt complex dyestuff contains only 1 cobalt atom per molecule and yields neutral brown prints.

Example 13

170 parts of the sodium salt of 1-hydroxy-5-acetoacetylamino-naphthalene-3-sulfonic acid are dissolved in 1,700 parts of water. 295 parts of the inner sulfate of 4 - (β - chloropropionylamino)-1-diazobenzene-2-sulfonic acid are introduced while stirring, the pH-value of the mixture is adjusted to the point of neutrality by addition of some sodium bicarbonate and the whole is stirred until the coupling is complete. The dyestuff which has precipitated in the form of crystals is filtered with suction. It constitutes a dark red powder and corresponds to the following formula

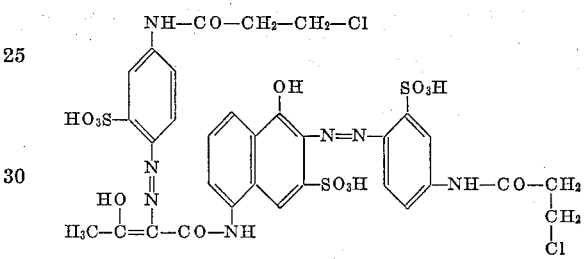

The dystuff dissolves in water with a yellowish-red color. On cellulose fabrics it produces red prints and padded dyeings having excellent properties of wet fastness.

Example 14

63 parts of the monoazo dyestuff obtained as described in Example 3 are introduced into 600 parts of water, and 26 parts of the inner sulfonate of 5-acroylamino-1-diazobenzene-2-sulfonic acid are added while stirring. The pH-value of the mixture is maintained at 7.0–7.5 by addition of some sodium bicarbonate, and the whole is stirred for several hours until the coupling is complete.

The dyestuff is precipitated with potassium chloride and filtered with suction. It is obtained in the form of a dark brown powder, which dissolves in water with a yellowish-brown color. The dyestuff corresponds to the following formula

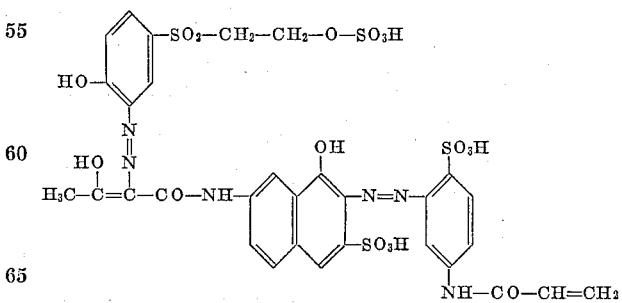

177 parts of the dyestuff which is obtained in a concentration of about 50% are introduced into a solution of 25 parts of crystallized copper sulfate and 55 parts of crystallized sodium acetate in 1,500 parts of water and the whole is heated for 1–2 hours to 80° C. After cooling the dyestuff is salted out by addition of sodium chloride. It constitutes a dark brown powder which dissolves in water with a yellowish-brown color. The dyestuff contains

Example 15

170 parts of the metal-free dyestuff prepared as described in Example 5 and having a purity of about 60% are dissolved in 900 parts of water. Within 1 hour 60 parts of sodium hydroxide solution of 38° Bé are dropped in at room temperature while stirring and stirring is continued for some time. The mixture is then neutralized by dropwise addition of a 20% hydrochloric acid, the vinylsulfone dyestuff formed is salted out by addition of 100 parts of sodium chloride and isolated by suction filtration. The dyestuff constitutes a dark brown powder and dissolves in water with the same color as the starting dyestuff but is more sparingly soluble than the latter. The dyestuff corresponds to the following formula

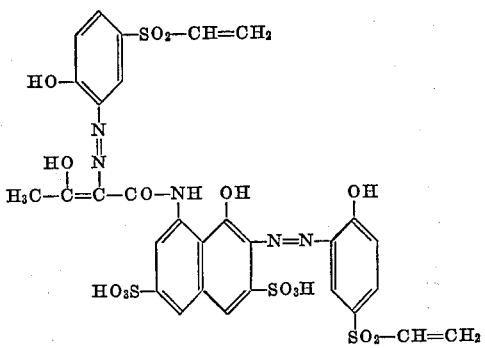

135 parts of the dyestuff which is obtained in a strength of about 60% are heated for about 1 hour to 80° C. in 750 parts of water containing 15 parts of cobalt acetate. After cooling 250 parts of sodium chloride are added, thus causing the precipitation of a dyestuff containing only 1 cobalt atom per 2 dyestuff molecules. The dyestuff which is obtained in the form of a blackish brown powder dissolves in water with a dark red brown color. The prints obtained on cotton or staple fiber fabrics show a strong dark brown shade having an excellent fastness to light and to washing.

Example 16

189 parts of 1-amino-2-hydroxybenzene-5-sulfonic acid are diazotized in the manner described in Example 2. 345 parts of the sodium salt of 1-hydroxy-7-acetoacetylaminonaphthalene-3-sulfonic acid are introduced into the mixture obtained in this manner, the pH-value is adjusted to 4.0 by addition of sodium bicarbonate, 100 parts of crystallized sodium acetate are added and the whole is stirred for several hours until the coupling is complete. In the course of this operation the yellow monoazo dyestuff formed precipitates partially. Then 230 parts of the diazoxide of 1-amino-2-hydroxybenzene-5-β-hydroxyethylsulfone are added, the pH-value of the mixture is adjusted to 9.0–9.5 by addition of anhydrous sodium carbonate and the whole is stirred for several hours at room temperature until the second coupling is complete. The mixture is then adjusted to a pH-value in a weakly acid range by dropwise addition of a 20% hydrochloric acid, and the precipitation of the disazo dyestuff is completed by addition of sodium chloride. The dyestuff which is obtained in the form of a dark red powder dissolves in water with a red color, and upon addition of alkali the solution changes to dark red with a greyish-green dichroism. The dyestuff corresponds to the following formula

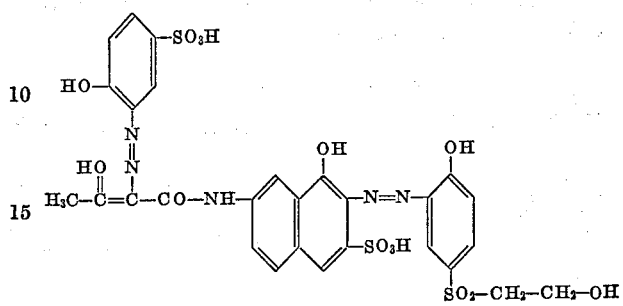

125 parts of said dyestuff which is obtained in a concentration of about 60% are slowly introduced into 625 parts of concentrated sulfuric acid while stirring. Stirring is continued for several hours at room temperature until the dyestuff has completely dissolved. Subsequently, the mixture is poured onto 1,900 parts of ice while stirring, the esterified dyestuff is salted out by addition of sodium chloride, filtered with suction and washed with saturated sodium chloride solution. The moist filter cake is then dissolved in 1,000 parts of water and neutralized with some sodium hydroxide solution. Within about 30 minutes 50 parts of a 36% potassium hydroxide solution are dropped in at room temperature and the whole is stirred for some time. The mixture is then adjusted to weak acidity by addition of a 20% hydrochloric acid and the dyestuff is precipitated by addition of sodium chloride. The isolated dyestuff constitutes a dark red powder which dissolves in water with the same color as the starting dyestuff. The dyestuff obtained corresponds to the following formula

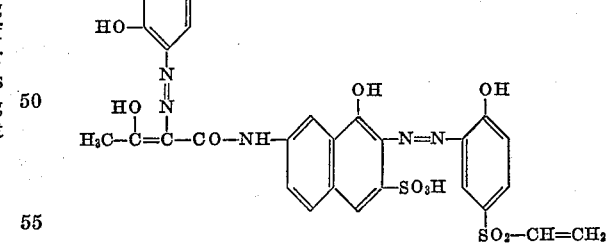

120 parts of the dyestuff which is obtained in a concentration of about 60% are converted into the cobalt complex in the manner described in Example 15. During the operation a dyestuff precipitates which contains 1 cobalt atom per 2 dyestuff molecules. The dyestuff is obtained in the form of a blackish brown powder and dissolves in water with a brown color. The prints and padded dyeings obtained on cotton or staple fiber fabric show a neutral brown color of an excellent fastness to light and to washing.

The corresponding chromium complex dyestuff containing 1 chromium atom per dyestuff molecule yields blackish-brown shades having likewise excellent fastness properties.

The dyestuffs specified in the following table can be prepared in analogous manner. They also yield dyeings and prints of good fastness properties.

| Diazo components | | Coupling component | Metal | Tint |
|---|---|---|---|---|
| I. Enolic side | II. Naphtholic side | | | |
| 1-amino-2-hydroxybenzene-5-β-hydroxyethylsulfonylsulfuric acid ester. | 1-amino-2-hydroxybenzene-5-β-hydroxyethylsulfonylsulfuric acid ester. | 1-hydroxy-7-acetoacetylaminonaphthalene-3-sulfonic acid. | Cr | Blackish-brown. |
| Do | do | do | Ni | Red brown. |
| 1-amino-2-hydroxybenzene-5-sulfonic acid | do | do | Cu | Do. |
| Do | do | do | Co | Neutral brown. |
| 1-amino-2-hydroxy-3-chlorobenzene-5-sulfonic acid. | do | do | Co | Do. |
| 1-amino-2-hydroxybenzene-5-sulfonic acid | 1-amino-benzene-4-β-hydroxyethylsulfonyl-sulfuric acid ester. | do | Cu | Clear red-brown. |
| Do | do | do | Co | Yellowish brown. |
| Do | 1-aminobenzene-3-β-chloroethylsulfone | do | Cu | Red brown. |
| 1-amino-2-hydroxybenzene-5-β-hydroxyethylsulfonylsulfuric acid ester. | 1-aminobenzene-4-sulfonic acid | do | Cu | Do. |
| Do | do | do | Co | Brown. |
| Do | 1-amino-2-hydroxybenzene-5-sulfonic acid. | do | Cu | Red brown. |
| Do | do | do | Co | Neutral brown. |
| Do | 1-aminonaphthalene-4-sulfonic acid | do | Cu | Red brown. |
| 1-amino-2-hydroxybenzene-4-β-hydroxyethylsulfonylsulfuric acid ester. | 1-amino-2-hydroxybenzene-5-β-hydroxyethylsulfonylsulfuric acid ester. | do | Cu | Do. |
| Do | do | do | Co | Neutral brown. |
| Do | do | do | Cr | Blackish brown. |
| 1-amino-2-hydroxybenzene-5-sulfonic acid | do | do | Cu | Violet-tinged brown. |
| Do | do | do | Co | Greyish brown. |
| Do | do | do | Cr | Blackish brown. |
| 1-aminobenzene-4-β-hydroxyethylsulfonylsulfuric acid ester. | 1-amino-benzene-4-β-hydroxyethylsulfonylsulfuric acid ester. | do | | Claret. |
| 1-amino-2-hydroxybenzene-5-β-hydroxyethylsulfonylsulfuric acid ester. | 1-aminobenzene-2-carboxylic acid-4-sulfonic acid. | do | Cu | Red brown. |
| Do | do | do | Co | Yellowish brown. |
| Do | do | do | Cr | Neutral brown. |
| 1-aminobenzene-2-carboxylic acid-5-β-hydroxyethylsulfonyl-sulfuric acid ester. | 1-aminobenzene-2-carboxylic acid-5-β-hydroxyethylsulfonyl-sulfuric acid ester. | do | Cu | Red brown. |
| Do | do | do | Co | Brown. |
| Do | do | do | Cr | Red brown. |
| 1-amino-2-nitrobenzene-4-sulfonic acid | 1-aminobenzene-4-β-hydroxyethylsulfonyl-sulfuric acid ester. | do | | Do. |
| Do | 1-amino-2-hydroxybenzene-5-β-hydroxyethylsulfonyl-sulfuric acid ester. | do | Cu | Claret. |
| Do | do | do | Co | Violetish red brown. |
| 1-aminobenzene-2-carboxylic acid | do | 1-hydroxy-6-acetoacetylamino-naphthalene-3-sulfonic acid. | Cu | Red brown. |
| Do | do | do | Co | Do. |
| Do | do | do | Cr | Brown. |
| 1-amino-2-hydroxybenzene-5-sulfonic acid | do | do | Cu | Claret. |
| Do | do | do | Co | Reddish brown. |
| Do | do | 1-hydroxy-5-acetoacetylamino-naphthalene-3-sulfonic acid. | Cu | Red brown. |
| Do | do | do | Co | Neutral brown. |
| Do | 1-aminobenzene-4-β-hydroxyethylsulfonyl-sulfuric acid ester. | do | Cu | Yellowish brown. |
| Do | do | do | Co | Brown. |
| Do | 1-aminobenzene-4-β-hydroxyethylsulfonyl-phosphoric acid ester. | do | Co | Do. |
| 1-aminobenzene-3-β-hydroxyethylsulfonyl-sulfuric acid ester. | 1-aminobenzene-3-β-hydroxyethylsulfonyl-sulfuric acid ester. | do | | Scarlet. |
| 1-amino-2-hydroxybenzene-5-β-hydroxyethylsulfonyl-sulfuric acid ester. | 1-amino-2-hydroxybenzene-5-β-hydroxyethylsulfonyl-sulfuric acid ester. | 1-hydroxy-7-(acetoacetyl-N-methyl-amino)-naphthalene-3-sulfonic acid. | Cu | Red brown. |
| Do | do | do | Co | Reddish dark brown. |
| Do | do | do | Cr | Bluish brown. |
| Do | do | 1-hydroxy-7-acetoacetylamino-naphthalene-3,6-disulfonic acid. | Cu | Red brown. |
| Do | do | do | Co | Neutral brown. |
| Do | do | do | Cr | Greyish brown. |
| Do | do | 1-hydroxy-8-acetoacetylamino-naphthalene-5-sulfonic acid. | Cu | Violet-tinged dark brown. |
| Do | do | do | Co | Do. |
| 1-amino-2-hydroxybenzene-5-β-hydroxyethylsulfonyl-sulfuric acid ester. | 1-amino-2-hydroxybenzene-5-β-hydroxyethylsulfonyl-sulfuric acid ester. | 1-hydroxy-8-acetoacetylamino-naphthalene-3,6-disulfonic acid. | Cu | Do. |
| Do | do | do | Co | Blackish brown. |
| Do | do | do | Ni | Ruby red. |
| Do | do | do | Mn | Claret. |
| Do | do | do | Fe | Yellowish brown. |
| 1-amino-2-hydroxynaphthalene-4-sulfonic acid. | do | do | Cu | Violet-tinged brown. |
| Do | do | do | Co | Violetish red brown. |
| Do | do | do | Cr | Grey. |
| 1-amino-2-hydroxy-3-nitrobenzene-5-β-hydroxyethylsulfonyl-sulfuric acid ester. | 1-amino-2-hydroxy-3-nitrobenzene-5-β-hydroxyethylsulfonyl-sulfuric acid ester. | do | Cu | Violetish red brown. |
| Do | do | do | Co | Violet-tinged grey. |
| 1-aminobenzene-3-β-hydroxyethylsulfonylphosphoric acid ester. | 1-aminobenzene-3-β-hydroxyethylsulfonyl-phosphoric acid ester. | do | | Scarlet. |
| 1-aminobenzene-3-β-chloroethylsulfone | 1-aminobenzene-3-β-chloroethylsulfone | do | | Do. |
| 1-amino-2,5-dimethoxybenzene-4-vinylsulfone. | 1-amino-2,5-dimethoxybenzene-4-vinyl-sulfone. | do | | Ruby red. |

| Diazo components | | Coupling component | Metal | Tint |
|---|---|---|---|---|
| I: Enolic side | II. Naphtholic side | | | |
| 1-amino-2-hydroxybenzene-5-β-hydroxyethylsulfonyl-sulfuric acid ester. | 1-amino-2-hydroxybenzene-5-β-hydroxyethylsulfonyl-sulfuric acid ester. | 1-hydroxy-8-acetoacetylamino-naphthalene-3,5-disulfonic acid. | Cu | Red brown. |
| Do | do | do | Co | Dark brown. |
| Do | do | do | Cr | Greyish brown. |
| Do | do | 1-hydroxy-3-acetoacetylaminobenzene-4-sulfonic acid. | Cu | Red brown. |
| Do | do | do | Co | Do. |
| 1-amino-2-hydroxybenzene-5-sulfonic acid. | 1-amino-4-(N-methyl-N-ethionyl)-aminobenzene. | 1-hydroxy-7-acetoacetylamino-naphthalene-3-sulfonic acid. | Cu | Do. |
| Do | do | do | Cr | Turbid red. |
| Do | 1-amino-4-(N-methyl-N-vinylsulfonyl)-aminobenzene. | do | Cu | Red brown. |
| Do | 1-amino-4-acroylaminobenzene | do | Cu | Do. |
| Do | do | do | Co | Do. |
| Do | 1-amino-2-methoxy-x-β-chloropropionyl-benzene (obtained by reaction of 1-amino-2-methoxybenzene with β-chloropropionylchloride according to Friedel-Crafts). | do | Cu | Do. |
| 1-amino-2-hydroxybenzene-5-β-hydroxyethylsulfonylsulfuric acid ester. | 1-amino-4-β-hydroxypropionylamino-benzene-sulfuric acid ester. | do | Cu | Do. |
| 1-amino-4-(N-methyl-N-β-chloroethylsulfonyl)-aminobenzene. | 1-amino-4-(N-methyl-N-β-chloroethylsulfonyl)-aminobenzene. | 1-hydroxy-8-acetoacetylamino-naphthalene-3,6-disulfonic acid. | | Dark red. |

We claim:
1. Water-soluble disazo dyestuff of the formula

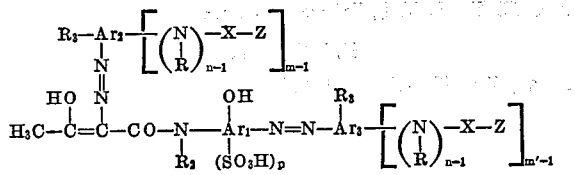

or a complex metal compound thereof containing a metal of the group consisting of copper, cobalt, nickel, chromium, manganese and iron, wherein $Ar_1$ represents a member selected from the group consisting of benzene and naphthalene; $Ar_2$ and $Ar_3$ represent members selected from the group consisting of benzene, naphthalene, benzene sulfonic acid, naphthalene sulfonic acid, lower alkoxy-benzenes, nitrobenzenes, nitrobenzene sulfonic acid, lower alkoxy-nitrobenzene sulfonic acid and chlorobenzene sulfonic acid radicals, R represents a member selected from the group consisting of hydrogen and lower alkyl, $R_2$ represents a member selected from the group consisting of hydrogen and lower alkyl, $R_3$ represents a member selected from the group consisting of hydrogen, hydroxyl, carboxyl and lower alkoxy; X represents a member selected from the group consisting of sulfonyl and carbonyl, Z represents a member selected from the group consisting of β-chloroethyl, β-sulfatoethyl, β-phosphatoethyl and vinyl, $n$ stands for one of the integers 1 and 2, $m$ and $m'$ stand for one of the integers 1 and 2 the sum of $m$ and $m'$ being at least 3, and $p$ stands for one of the integers 1 and 2, and wherein the groups $R_3$ in $Ar_2$ and $Ar_3$ and —OH in $Ar_1$ are each linked in ortho-position to the adjacent azo group.

2. The complex chromium compound of the dyestuff of the formula

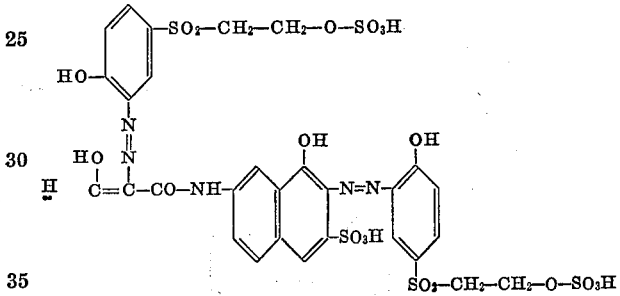

3. The complex copper compound of the dyestuff of the formula

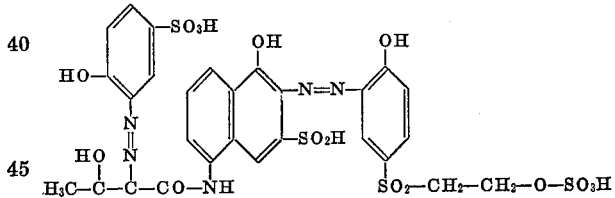

4. The complex chromium compound of the dyestuff of the formula

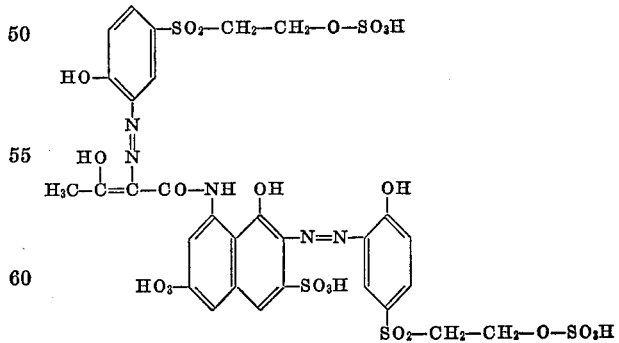

5. The dyestuff of the formula

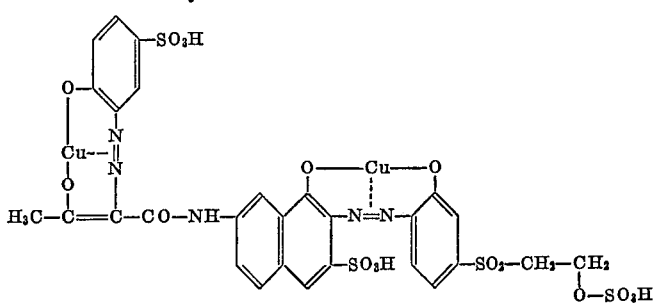

6. The complex copper compound of the dyestuff of the formula
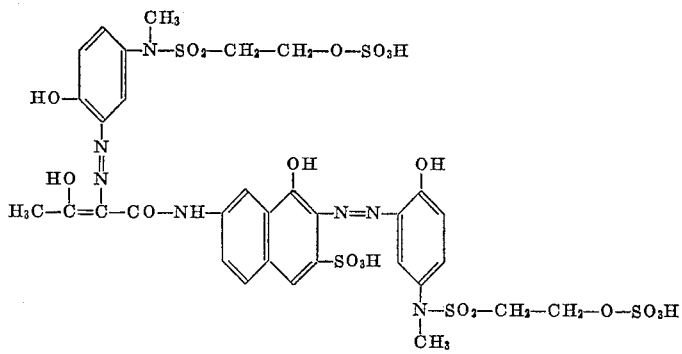
7. The complex cobalt compound of the dyestuff of the formula
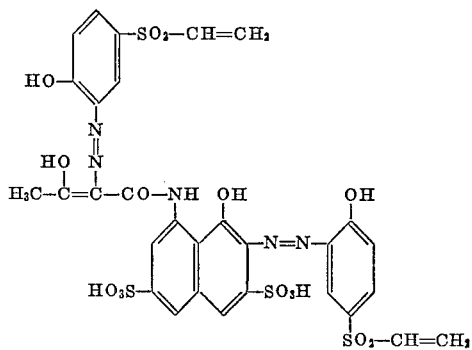
References Cited
UNITED STATES PATENTS
| | | |
|---|---|---|
| 2,251,921 | 8/1941 | Dickey et al. ____ 260—176 XR |
| 2,474,024 | 6/1949 | Anderson _____ 260—176 |
| 3,135,730 | 6/1964 | Heyna et al. _____ 260—148 XR |
FLOYD D. HIGEL, *Primary Examiner.*
U.S. Cl. X.R.
8—42, 43; 260—176, 458, 507